June 18, 1929.  R. O. HELGEBY  1,717,684
MOUNTING OF TEMPERATURE COMPENSATOR FOR SPEEDOMETERS
Filed June 2, 1928
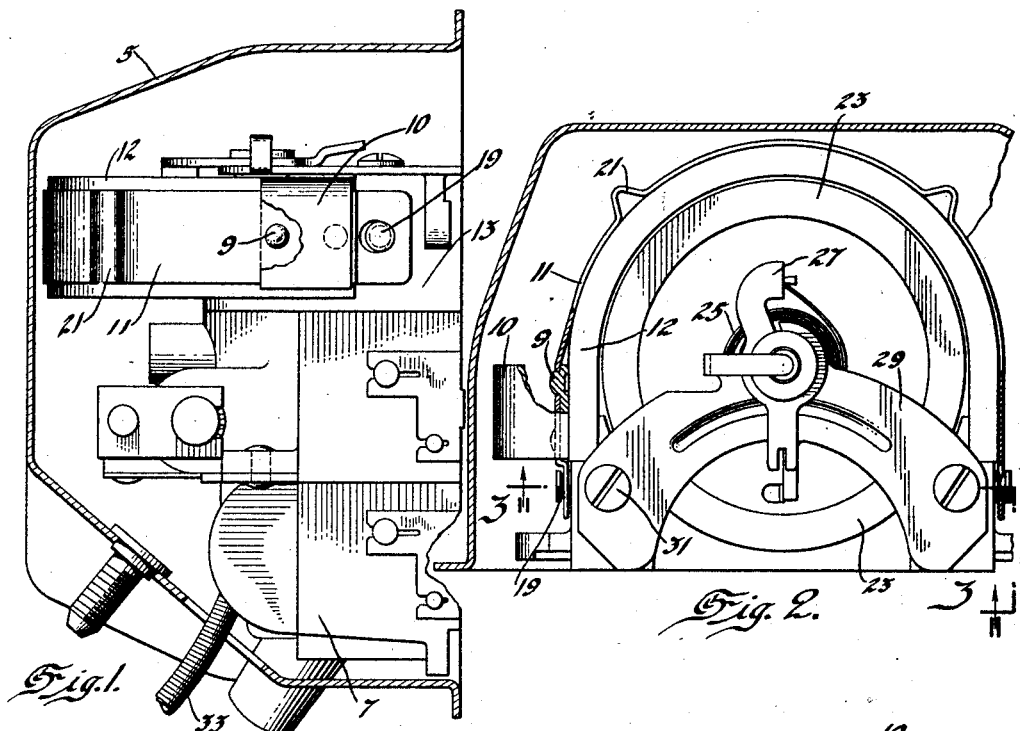
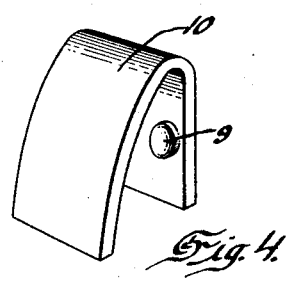
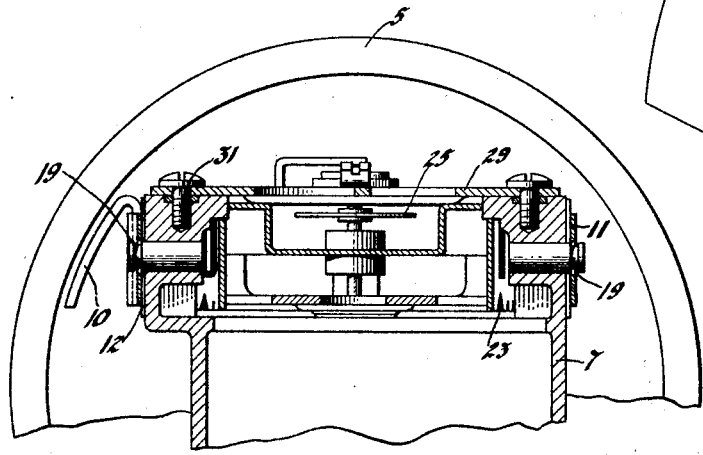
Inventor
Ralph O. Helgeby
By Blackmore, Spencer & Hink
Attorney Patented June 18, 1929.

1,717,684

UNITED STATES PATENT OFFICE.

RALPH O. HELGEBY, OF FLINT, MICHIGAN, ASSIGNOR TO A C SPARK PLUG COMPANY, OF FLINT, MICHIGAN, A COMPANY OF MICHIGAN.

MOUNTING OF TEMPERATURE COMPENSATOR FOR SPEEDOMETERS.

Application filed June 2, 1928. Serial No. 282,422.

This invention relates to measuring instruments and is particularly concerned with means associated therewith for compensating temperature changes, to thereby secure accurate readings at all temperatures. While useful elsewhere, the arrangement has been designed more specially for use with speedometers for motor vehicles.

An object of the invention is to render the reading of a magnetic measuring instrument accurate at all temperatures. As a further object, the invention provides an improved mounting for such a compensating means. Other objects include efficiency in operation, economy in manufacture, simplicity and convenience in assembly.

In the drawing illustrating a preferred embodiment of the invention:

Figure 1 is a view in vertical section through an instrument casing, showing the enclosed parts in side elevation, parts broken away.

Figure 2 is a view in horizontal section through the casing showing the frame member and parts carried thereby in top plan view, with parts broken away.

Figure 3 is a vertical section on line 3—3 of Figure 2.

Figure 4 is a perspective view of the compensator.

The use of a nickel copper alloy to attain the principal object stated above has been heretofore proposed. Such an alloy has magnetic conductivity which is variable. It has practically no such conductivity at high temperatures and its conductivity increases with falling temperature. In accordance with this invention, such an alloy is so positioned relative to the active magnetic field and the instrument casing that, together with the casing, it forms a magnetic shunt which is more effective at low temperatures and less effective at high temperatures. In the absence of some such a compensator, it is well known that a magnetic measuring instrument cannot be calibrated to be accurate at both high and low temperatures. If accurate for high temperatures, the readings are too high when the temperature falls. Since at low temperatures the shunt is relatively more effective, it weakens the magnetic field in the inter-polar gap and thus corrects the relatively high low temperature readings which would otherwise occur.

As shown in the drawing, a casing 5 is used to house an instrument frame 7. This frame is to carry the parts of the speedometer and the odometer, in accordance with conventional practice.

With reference to the speedometer, there is shown a magnet 12 of U-shape held on frame 7 by a strap 11 of non-magnetic material. The strap embraces the magnet and is secured as at 19 to the frame. One or more crimps 21 are formed in the strap by which it may be pinched to hold the magnet firmly in position. While not constituting a part of this invention, there may be mentioned the speed indicating cup 23 which is to be rotated by magnetic drag and to be biased to a zero position by hair spring 25, the latter being variably positioned by a lever 27 pivoted on a top plate 29 secured as at 31 to the instrument frame.

Figure 4 shows a U-shaped piece 10 of nickel copper alloy which is to serve as the temperature compensator. One leg of the compensator is flat and is provided with a lug 9. This leg is positioned against the outer face of the magnet and under the strap 11. The lug 9 enters a hole provided therefor in the strap so that when the strap is positioned and the magnet made fast by pinching the strap, the compensator is also secured in position relatively to the magnet. The other leg of the compensator is preferably curved outwardly into proximity to the casing, as shown in Figure 2 and Figure 3, which casing is preferably of magnetic material, so that the compensator together with the casing constitutes a variable magnetic shunt, as explained above.

Portions of the parts associated with the frame and relating to the odometer mechanism are shown, but since these parts constitute no part of the invention they need not be described. It will be sufficient, for the purpose of this application, to explain that a flexible shaft 33 drives a rotor shaft within the frame, which is used both to actuate a rotor element within the magnet and speed cup, and from the rotation of which the odometer wheels are driven.

By the expedient set forth, an effective compensator is produced, one which is cheap, has no movable parts and is efficient. The mounting of the compensator is extremely simple, requiring only that the compensator element be placed in position with its lug 9 entering the hole in the strap before the crimps of the strap are pinched to secure the magnet in position. This act of fixing the magnet in position on the frame simultaneously secures the compensator. The compensator as described is thus mounted independently of the casing and requires a minimum of machining operations. It becomes a part of the speedometer unit as a whole which may be taken from the casing with the supporting frame and replaced, if necessary, since it is easily detachable.

I claim:

1. In a magnetic measuring instrument, a frame, a magnet, a temperature compensator, unitary means to secure said magnet to said frame and to simultaneously secure said compensator relatively to said magnet.

2. In a magnetic measuring instrument, a frame, a U-shaped magnet, a U-shaped strap embracing said magnet and secured to said frame, a temperature compensator, having a part clamped between said strap and said magnet.

3. In a magnetic measuring instrument, a magnet, fastening means for said magnet, a temperature compensator having a lug engaged by said fastening means whereby said fastening means holds both the magnet and compensator in position.

4. In a magnetic measuring instrument, a frame, a U-shaped magnet positioned on said frame, and a strap embracing said magnet, said strap having a crimp and terminally secured to said frame, a U-shaped temperature compensator having one leg located between said magnet and said strap, whereby said crimp may be pinched to both secure said magnet and said compensator.

5. The invention defined by claim 4, said strap and said compensator having parts inter-engaging when assembled to retain said compensator in position.

6. The invention defined by claim 4, together with an enclosing casing, said compensator having a part in proximity to said casing to constitute therewith a magnetic shunt having conductivity variable with changes in temperature.

In testimony whereof I affix my signature.

RALPH O. HELGEBY.